United States Patent Office 3,541,275
Patented Nov. 17, 1970

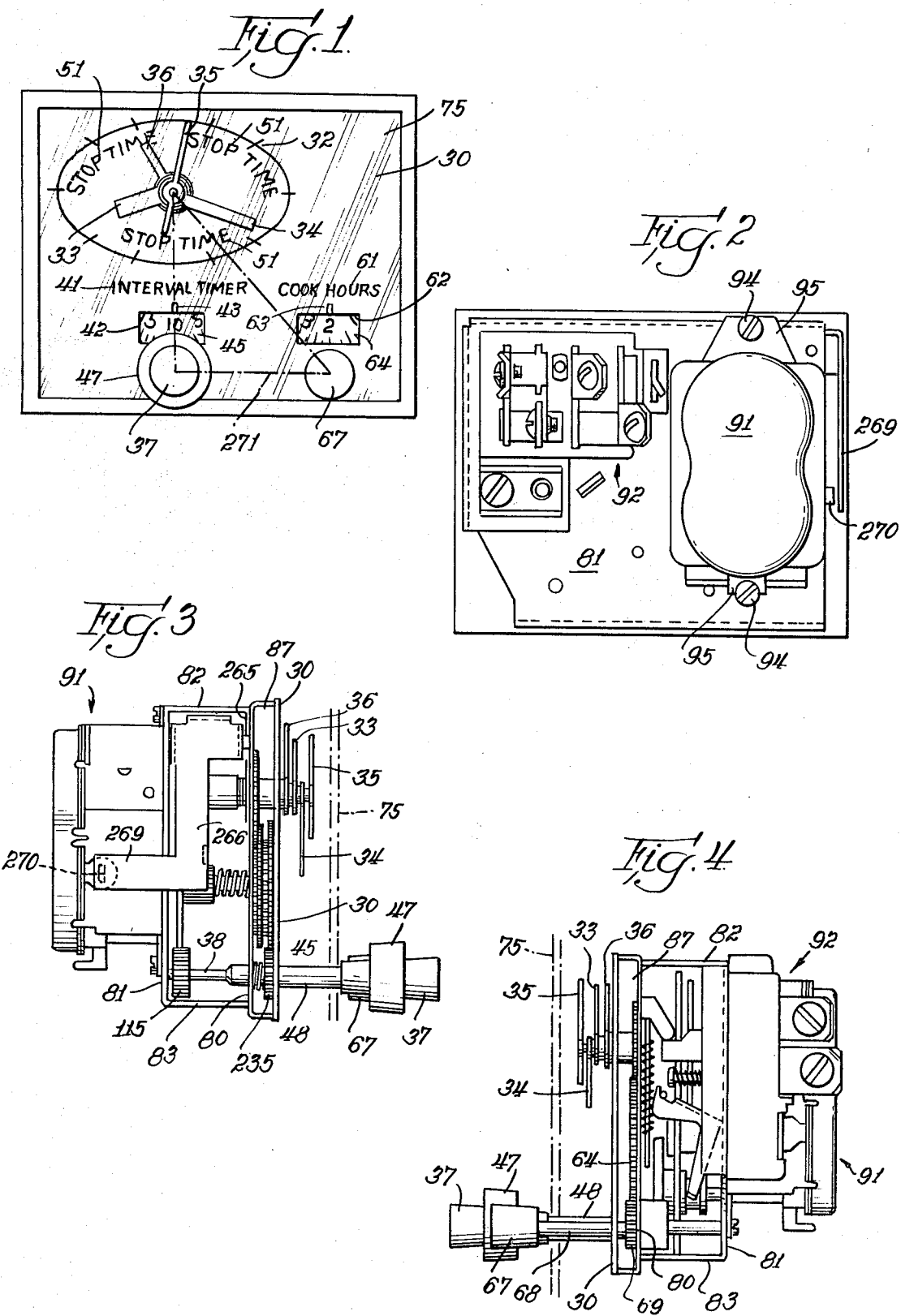

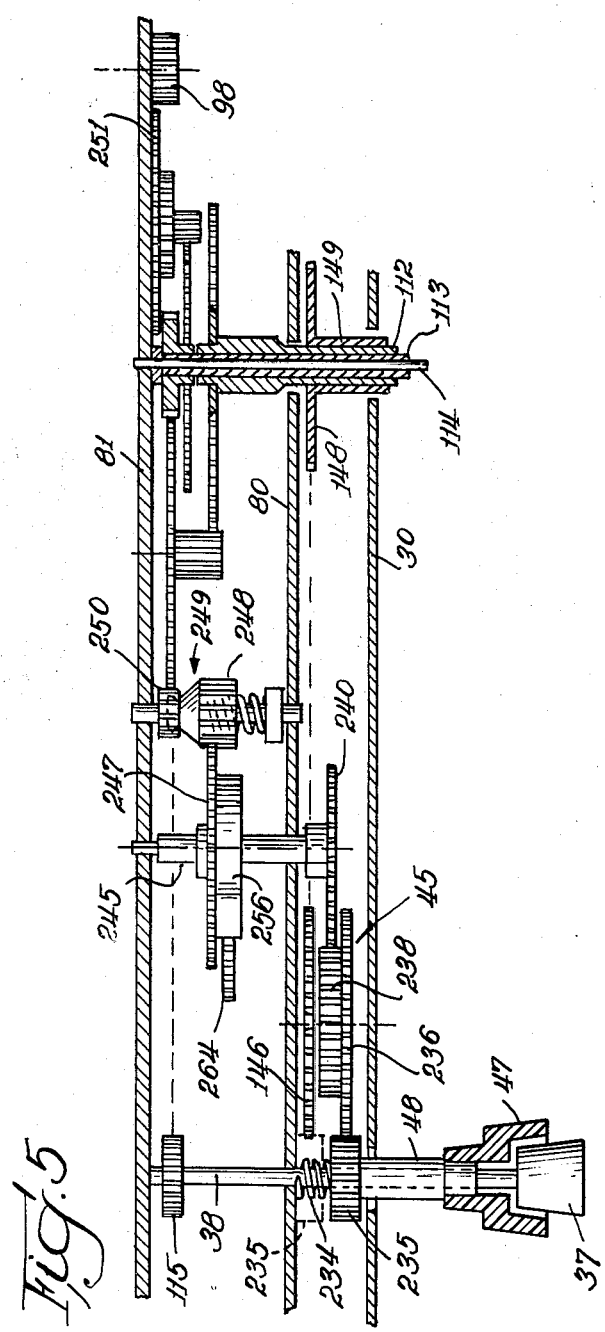
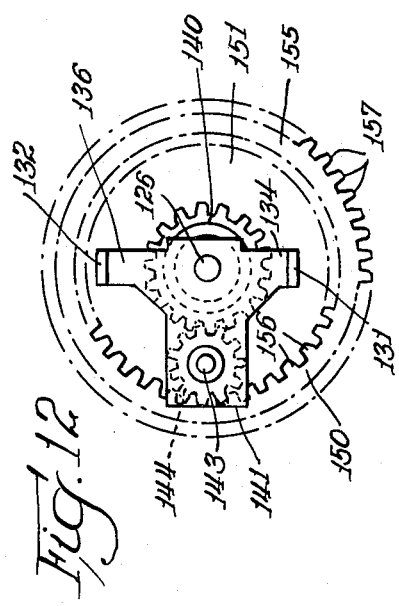

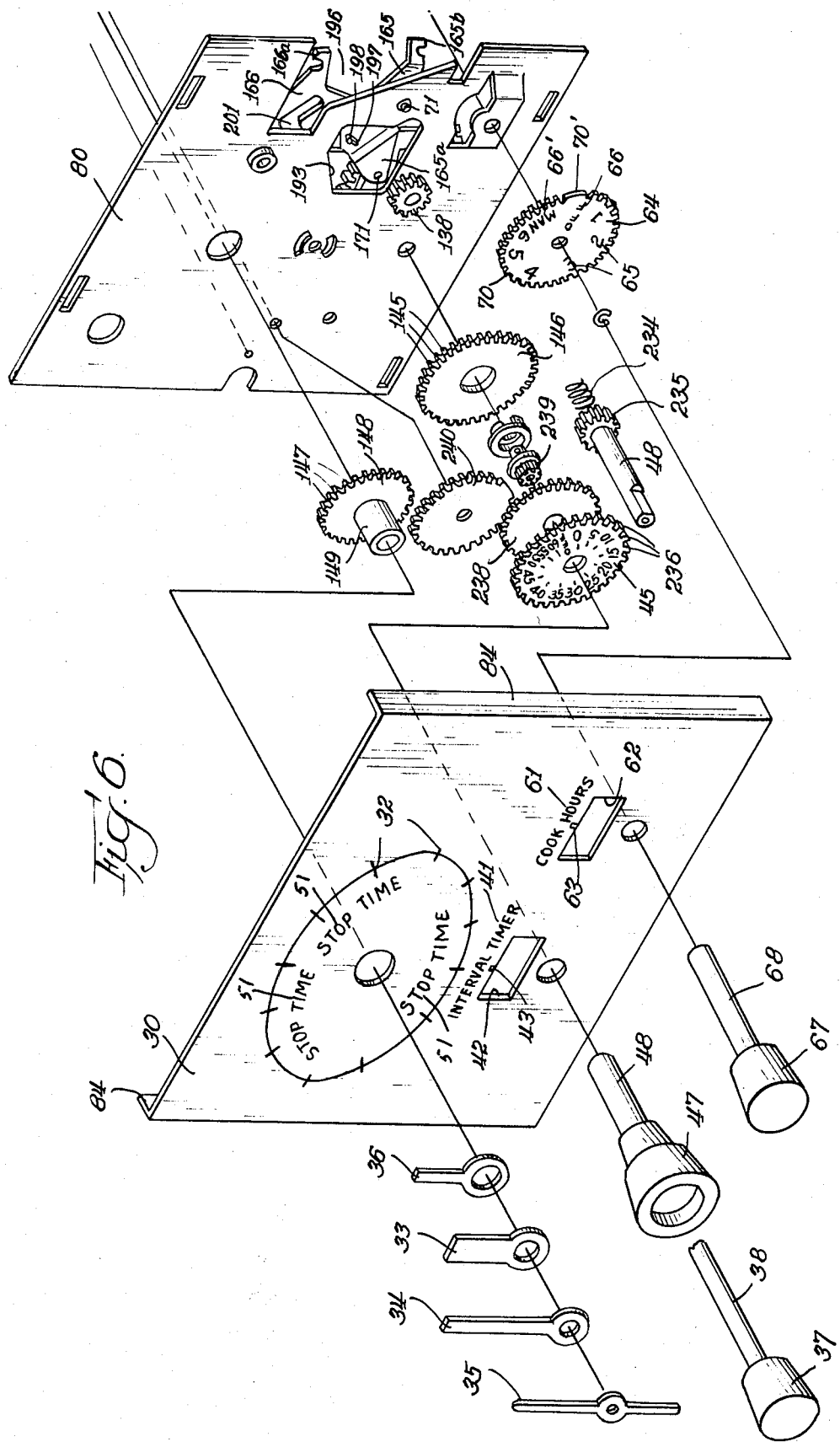

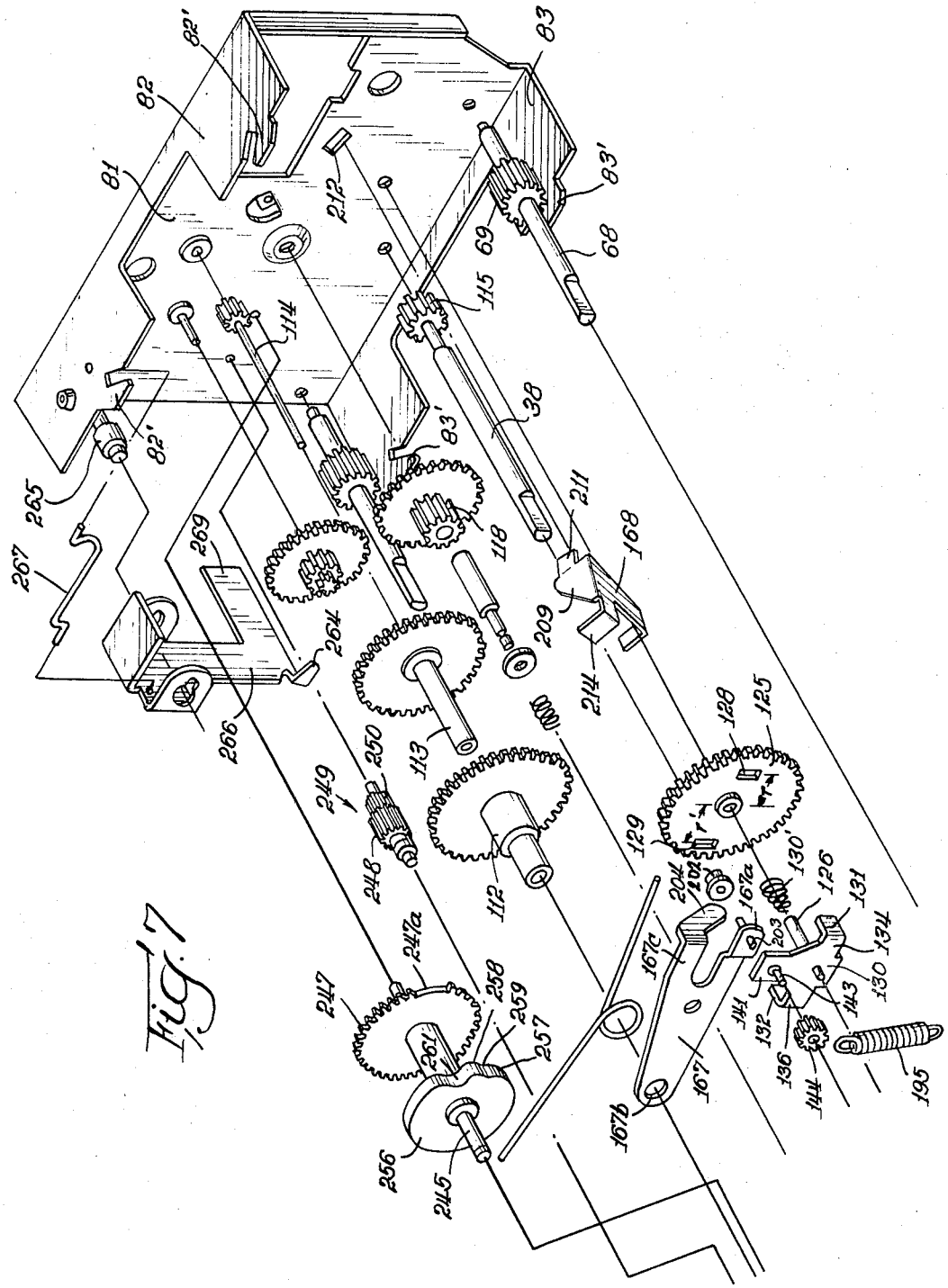

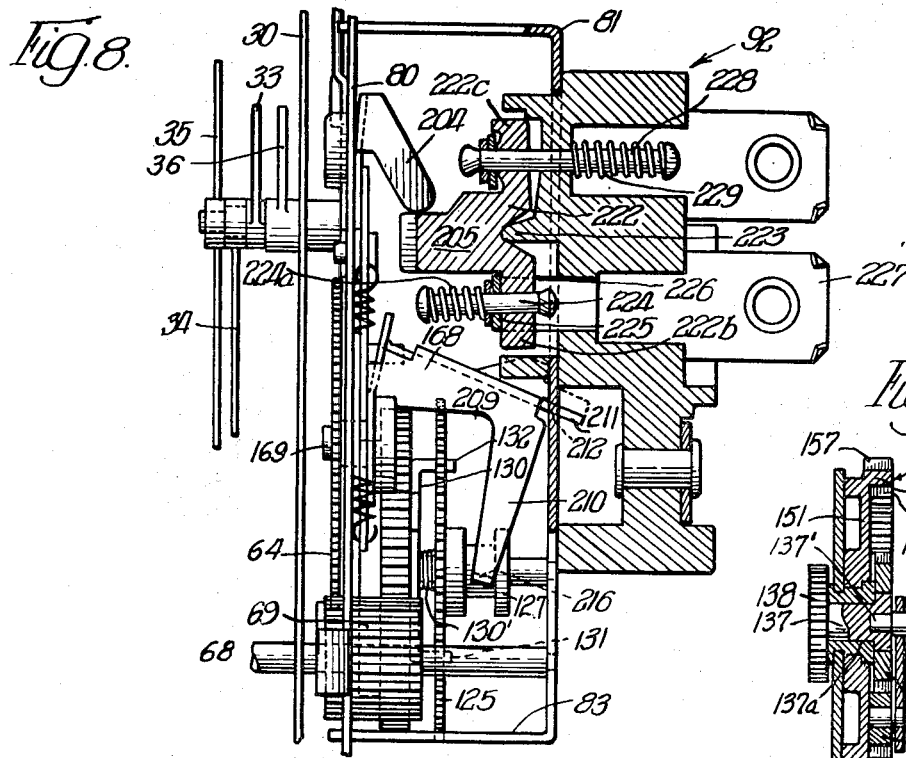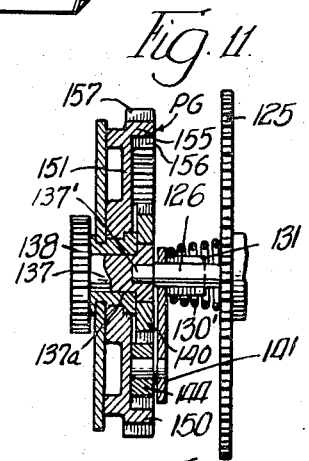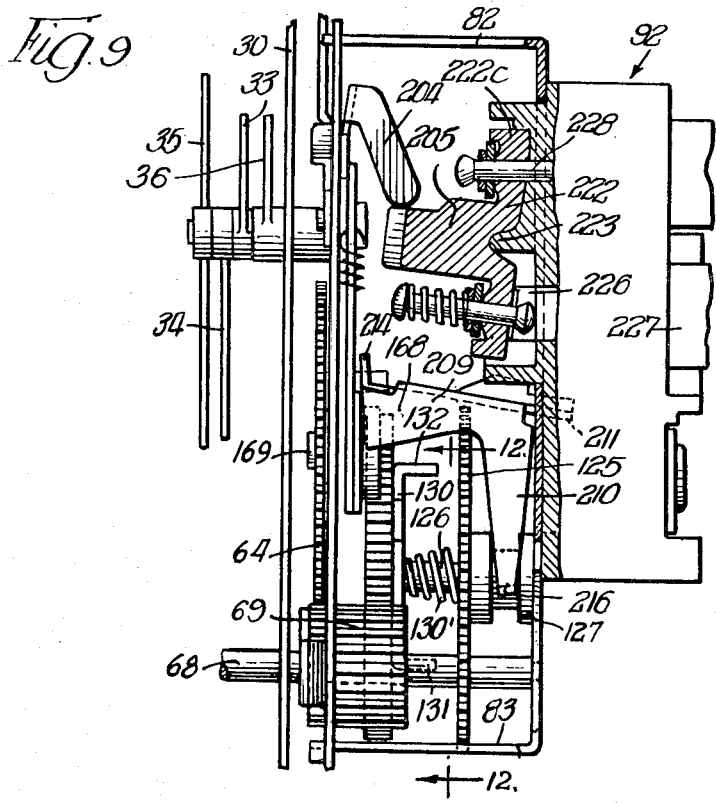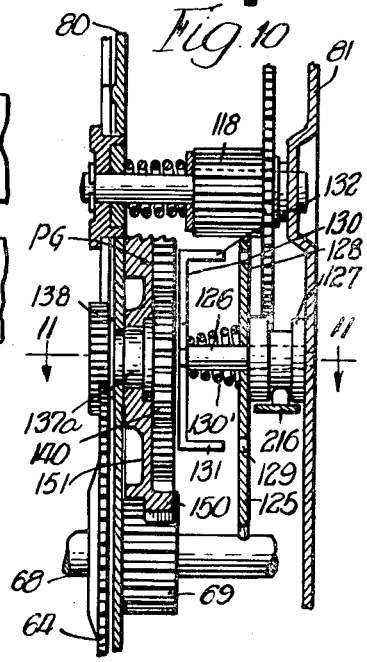

3,541,275
PRESETTABLE TIMING MECHANISM AND SIGNALLING DEVICE FOR COOKING STOVES AND THE LIKE
Ronald M. Bassett, Chicago, Ill., assignor to International Register Company, Chicago, Ill., a corporation of Illinois
Filed Nov. 26, 1968, Ser. No. 779,083
Int. Cl. H01h *43/14*
U.S. Cl. 200—38          7 Claims

ABSTRACT OF THE DISCLOSURE

A stop time hand is mounted coaxially with the time indicating hands of a synchronous motor driven mechanism to indicate by its position relative to the hours scale the time that the oven is to be deenergized to stop cooking. An interval timer is also driven by the motor. The minute and hour hands are set by a time set knob on a shaft having a hollow shaft rotatably and slidably mounted thereon and held outwardly by a spring so that an outer knob can adjust the interval timer. When the outer knob and hollow shaft are moved inwardly and rotated, the stop time hand is rotated to the desired stop time and at the same time a planetary gear mechanism is adjusted to effect energization of the oven and start the cooking cycle according to the required number of cooking hours that are set on a cook hours dial which also is connected to the planetary gear mechanism.

---

This invention is an improvement over the timing mechanism shown in Gallagher et al. U.S. Pat. 3,098,131, issued July 16, 1963 and the disclosure thereof is incorporated herein by reference.

While the patent above referred to shows a relatively compact timing mechanism, a need has arisen for a still more compact timing mechanism because of certain space limitations that have developed in the construction of electric and gas cooking ranges. Among the objects of this invention are: To provide a more compact timing mechanism than that shown in the above patent while retaining all of the functions capable of being performed by that timing mechanism; to utilize the clock time scale in conjunction with a stop time hand rotatable about the axis of the time indicating hands for setting the stop time; to adjust the stop time hand by a knob on a shaft that is also used to set an interval timer; to provide for endwise movement of the stop time and interval set shaft on a time set shaft arranged to position the hour and minute hands to the correct time indications relative to the time scale; to bias the stop time and interval set shaft to an interval set position requiring that the spring action be overcome to move this shaft to the stop time set position; and to correlate the setting of the stop time hand with the setting of a cook hours dial to effect the energization and deenergization of the oven at the desired time and for the desired cooking time.

According to this invention a timer for a device, such as an electric or gas range having a thermostatically controlled oven, is provided. The timer has a twelve hour clock face with respect to which second, minute and hour hands, driven by a synchronous motor, rotate about a common axis. Also a stop time hand is rotatable about this axis and is manually presettable to indicate the time at which the oven is to be deenergized at the end of the preset cooking period by previously closed contacts. Below and to one side of the clock face is a cook hours dial that is visible through a cooking hours sight window and is manually settable by a knob therebelow to the number of hours required to perform the cooking operation which begins on closure of the contacts the preset hours before stop time. Below the clock face are inner and outer knobs which are rotatable about a common axis below an interval time sight window through which an interval time dial driven by the synchronous motor is visible. The inner knob is arranged to set the minute and hour hands to the time of day. The outer knob is movable inwardly along its axis of rotation against a spring to drive a gear train for setting the stop time hand to the desired cooking stop time. In its outer position where it is held by the spring, the outer knob drives a gear train to rotate the interval time dial to set it to the desired time interval at the end of which an audible signal is sounded.

In the drawings: FIG. 1 is a view, in front elevation, of a timing device embodying this invention. FIG. 2 is a rear elevation of the timing device. FIG. 3 is a view in side elevation of the timing device, looking from left to right. FIG. 4 is a view, in side elevation, of the timing device looking from right to left. FIG. 5 is a top plan view, somewhat diagrammatic in character, of a portion of the gearing for the timing device. FIG. 6 is an exploded perspective view of a part of the front portion of the timing device. FIG. 7 is an exploded perspective view of a part of the rear portion of the timing device. FIG. 8 is a right hand end view somewhat comparable to FIG. 4, but being on a larger scale and being partly broken away in section, this view illustrating the position of the parts with the electrical switch closed. FIG. 9 is a view similar to FIG. 8 but illustrating the position of the parts when the electrical switch is in the open circuit position. FIG. 10 is a fragmentary sectional view taken axially through the planetary gear system. FIG. 11 is another fragmentary sectional view of the planetary gear system, taken on the plane of the line 11—11 of FIG. 10. FIG. 12 is a detail elevational view of the planetary gear system, taken approximately on the plane of the line 12—12 of FIG. 9.

FIGS. 1–4 and 6–12 correspond generally to the same numbered figures of the above mentioned patent. Insofar as possible the reference characters used herein are applied generally to the same elements to which they are applied in this patent. Where necessary additional reference characters are used.

Referring to FIG. 1, the timing mechanism comprises a front face or dial plate 30 on which are arranged the clock dial, the interval timer sight window and setting knob, which is also the stop time setting knob, the time set knob, and the cooking hours sight window and setting knob. The clock dial comprises an hours scale 32 in front of which revolve an hour hand 33, a minute hand 34, a sweep second hand 35, and a stop time hand 36. The time setting of the hour and minute hands can be corrected or set by rotating a time setting knob 37 mounted on a time setting shaft 38 located centrally below the clock dial.

The interval timer mechanism comprises an "Interval Timer" designation 41 below which is a sight window 42 punched out of the dial plate 30 and provided with a centrally located index marker 43. Rotating behind this sight window for registration with such index marker is an interval time dial 45. The setting of this interval timer is effected through the rotation of an outer knob 47 secured to a hollow setting shaft 48, FIG. 5, located directly below the interval timer sight window 42.

According to this invention the hours scale 32 is also used to indicate the stop time when the stop time hand 36 is positioned relative to it by rotation of the outer knob 47 in a manner to be described. Thus "Stop Time" designations 51 are located along the time scale 32 as shown in FIG. 1. The stop time hand 36 is rotatable about the axis of rotation of the hour hand 33, minute hand 34 and second hand 35. Thus double use is made of the hours scale 32.

The range timer controls also include a "Cooking Hours" designation or indicia 61, adjacent to the right hand edge of the dial plate 30, and below which is a sight window 62 punched out in the dial plate 30 and also provided with an index marker 63. Rotating behind this sight window 62 is a cooking hours dial 64 bearing time markings and time numerals designated 65, the range of these latter numerals extending from approximately 1 to 6 inclusive. Imprinted on this dial face between the beginning and the ending of this cooking hours scale is an "Off" designation 66 and a "Man" designation 66', FIG. 6, the latter being an abbreviation indicating that the range timer is in the manual position. The cooking hours setting are effected by rotation of a knob 67 secured to a rotatable setting shaft 68 located below the cooking hours sight window 62. This shaft 68 carries a pinion 69 which meshes with spur teeth 70 formed around the periphery of the cooking hours dial 64 for adjustably rotating the latter; the dial having a narrow sector 70', FIG. 6, between the end of the numbered scale and the "Man" designation where the dial extends out to the tooth tip diameter but is devoid of spur teeth 70. This cooking hours dial 64 has rotative mounting on a bearing stud 71 having support in the front frame plate 80.

Disposed in front of the dial plate 30 and clock hands 33–35, etc., is a conventional cover glass 75 having appropriate openings for passing the setting shafts 48 and 68 therethrough so as to dispose the setting knobs 37, 47 and 67 in front of this cover glass.

Referring now to the frame structure, and to the operating parts of the oven timer, the frame structure comprise a front frame plate 80 and a rear frame plate 81 which are fastened together in spaced relation through the medium of mounting extensions or flanges 82, 83, etc. These mounting extensions are bent forwardly from the upper and lower edges of the rear frame plate 81 and have tongues 82', 83', FIG. 7, which pass through mounting slots in the front frame plate 80, these tongues being staked or bent over on the front side of the front mounting plate. Flanges 84, extending rearwardly from the ends of the dial plate 30, space it from the front plate 80.

Mounted on the rear frame plate 81, FIG. 2, adjacent one end thereof is a synchronous electric motor 91 which drives all of the operating parts, and mounted on this frame plate adjacent to the other end thereof is the electrical contact switch 92 which controls the oven, either of the electrically heated type or the gas heated type. The synchronous motor unit 91 is secured to the rear frame plate 81 in any desired manner, such as by having screws 94 pass through apertured lugs or ears 95 projecting outwardly from the base of the motor. A pinion 98, FIG. 5, driven by the motor 91, transmits a continuous time driven rotation of the hour hand 33, a minute hand 34, and sweep second hand 35. This time driven rotation occurs through a conventional arrangement or assembly of clock train gearing, such as that shown in the above patent, and serves to transmit continuous time driven rotation at appropriate speed to an hour hand arbor 112, the minute hand arbor 113 and the second hand arbor 114. The clock setting shaft 38 carries a pinion 115 adjacent to its inner end which is operable to transmit clock setting rotation from the setting knob 37 to the clock hands through meshing engagement with one of the gears of the clock train gearing.

Arranged to be continuously driven by the clock train is a continuously rotating pinion 118, FIG. 7, which lies parallel with and directly below the concentric axes of the clock hands and arbors. The pinion 118 meshes with the toothed periphery of a relatively large time driven tripping gear 125 which has continuous time driven rotation about an independently rotatable planetary gear carrier mounting shaft 126 which extends transversely of the frame plates 80 and 81 below the axis 71 of the cooking hours dial 64. This shaft 126 has its rear end rotatably mounted in the rear frame plate 81, and its front end in a sun gear stud, to be later described. In addition to being continuously time driven from the clock train gearing, this large gear wheel 125 is adapted to have axial shifting movement on the rear portion of the carrier mounting shaft 126, this axial shifting movement being for the purpose of establishing a clutching or positive locking engagement between such time driven wheel 125 and a planetary gear spider or carrier 130 which is secured fast to the carrier mounting shaft 126. This positive locking engagement resulting from forward shifting of the wheel 125 automatically determines the time when the cooking operation is to start, and the automatic release of the locking or clutching engagement caused by rearward shifting of the time driven wheel 125 terminates the cooking operation at the time which has been set up by the stop time hand 36. Surrounding the carrier mounting shaft 126 between the front side of the axially shiftable time driven wheel 125 and the opposing rear side of the planetary gear carrier 130 is a conically coiled compression spring 130' which normally tends to shift the time driven wheel 125 rearwardly out of positive clutching engagement with the planetary gear carrier. Anchored to the back side of the shiftable time driven wheel 125 is an annularly grooved shifter collar 127 which receives shifting movement from a lever system, to be later described.

Referring now to the manner in which the above positive locking and unlocking is accomplished, it will be seen that the time driven wheel 125 has two tripping slots 128 and 129 punched entirely therethrough at diametrically opposite points of the time driven wheel; and attention is directed to the fact that the tripping slot 128 is located a a radius $r$ from the center of the gear wheel 125, and that the other tripping slot 129 is located at a substantially greater radius $r'$ from the center of this notched time wheel. Once in every 12 hours, these tripping slots 128 and 129 are adapted to rotate into registration with two upstanding tripping lugs 131 and 132 which project rearwardly toward the forward face of the slotted time driven wheel 125. These rearwardly projecting tripping lugs are bent from the ends of two diametrically opposite arms 134 and 136 of the three-arm planetary spider or carrier 130. These two diametrically opposite upstanding tripping lugs 131 and 132 are also located at the aforementioned differential radii $r$ and $r'$ described above in connection with the tripping slots 128 and 129, so that these tripping lugs can only snap into the slots once in every 12 hours, whereby two separate cooking operations cannot be accidentally started and stopped automatically during the course of a single day. The tripping lugs 131 and 132 have a relatively snug fit within the tripping slots 128 and 129 for obtaining close accuracy in the automatic control times of the cooking operation.

Referring now to the employment of the planetary gear system, this includes as one component part of the system the above mentioned three-arm planetary carrier 130, the latter being firedly mounted on the carrier shaft 126. The rear end of this carrier shaft 126 has rotatable mounting in a bearing hole in the rear frame plate 81, and the front end has rotatable mounting in a bearing hole 137' formed in a sun gear stud 137, FIG. 11, as described in the Gallagher et al. patent. This sun gear stud 137 has rotatable mounting in a stationary bearing bushing 137a anchored in the front frame plate 80. Secured fast to the front end of this sun gear stud 137 is a front pinion 138 and secured fast to the rear end of this stud is a sun gear 140 of the planetary gear system. The spur teeth of the front pinion 138 have permanent mesh with the spur teeth 145 formed around the outer periphery of an intermediate gear 146, FIG. 6, which meshes with spur teeth 147 of a stop time gear 148 mounted on an arbor 149 to which the stop time hand 36 is secured. Hence, it will be seen that each and every angular adjustment given to the stop time hand 36 through manual rotation of the stop time setting knob 47, when moved inwardly, is immediately transmitted through the front pinion 138 and sun gear stud 137 to the sun gear 140, whereby the angular position of the sun gear 140 is a constant index of the stop cooking time which has been set up by the stop time hand 36.

Referring particularly to FIG. 11, it will be seen that the spider or carrier 130 has a third or intermediate carrier arm 141 projecting therefrom, and extending from this arm is a pivot pin 143 on which is rotatably mounted the planetary gear or pinion 144 of the planetary system PG. This planetary pinion 144 meshes with the sun gear 140 and swings in an arc or orbital path around the sun gear 140 while remaining in continuous mesh therewith. Hence, all rotation transmitted to the stop cooking hand 36 is also transmitted to the sun gear 140. This rotation will be transmitted by way of the sun gear 140 to the planetary pinion 144 for swinging the latter in its orbital path, the outer planetary ring gear 150 remaining stationary at this time. Thus it will be seen that any and all stop cooking adjustments set up by the stop cooking hand 36 will be immediately transmitted to the planetary pinion 144 for causing it to assume a position in its orbital path of movement around the sun gear 140, corresponding to the setting given the stop cooking hand 36.

Referring now specifically to the third principal element of the planetary gearing PG, i.e., to the outer internal ring gear 150 which concentrically surrounds the sun gear 140 and the planetary pinion 144, it will be seen from FIGS. 10–12 that this outer internal ring gear 150 comprises a web portion 151 having a large central aperture therein, which has rotatable bearing mounting over the outside cylindrical surface of the stationary bearing bushing 137a, in which is rotatably mounted the sun gear stud 137. Projecting rearwardly from the periphery of the web 151 is an annular flange 155 which defines a circular cavity in this face of the ring gear 150 in which rotate the sun gear 140 and planetary pinion 144. Formed around the inside of this annular flange 155 are the spur teeth of an internal planetary gear 156 with which the teeth of the planetary pinion 144 remain in constant mesh, either in the orbital motion of the planetary pinion 144, or in the outside circular movement of the outer planetary ring gear 150. Formed around the outside of this annular flange 155 are the spur teeth of an outer external ring gear 157. Meshing with this outer ring gear 157 is the aforementioned setting pinion 69 which meshes with the toothed periphery of the cooking hours dial 64 and sets up the different desired cooking hours times on said dial. The setting pinion 69 is of sufficient length to mesh with the spur teeth 70 of the cooking hours dial on the front side of the front frame plate 80, and also to mesh with the outer spur teeth 157 of the planetary ring gear 150 on the inner side of this front frame plate. It will thus be seen that the planetary ring gear 150 is positively and permanently tied to the cooking hours dial 64 so that it will always have concurrent rotation therewith whenever the cooking hours knob 67 and cooking hours dial 64 are rotated.

Referring now to the lever system which responds to the cam surfaces formed on the cam projecting integrally from the forward face of the planetary ring gear 150, this lever system comprises: a first cam responsive lever 165 which is directly responsive to these cam surfaces; a second lever 166 which is responsive to the first lever 165; a third lever 167 which is actuated by the second lever 166; and a fourth lever 168, FIGS. 8 and 9, which is also actuated by the second lever 166. The first or primary cam responsive lever 165 has pivotal mounting on the aforementioned bearing stud 71 which is anchored in the front plate 80, for pivotally mounting the cooking hours dial 64, and which has an enlarged head on the back side, whereby the pivot stud 71 also functions as the pivot for the first lever 165 and for the second lever 166. The left hand arm of this first lever 165 overlies the forward cam bearing face of the cam on gear 150 and carries a cam follower pin 171 which responds to different cam surfaces formed in the forward face of the planetary ring gear 150 which cam surfaces rotate synchronously with the planetary ring gear 140.

During the cooking operation, the cooking hours dial 64 is rotated reversely in a clockwise direction, hour by hour, corresponding to the motion of the clock hour hand 33, until at the conclusion of the cooking operation a cam slot on the cam on gear 150 comes into position under the cam follower pin 171. Thereupon, the cam follower pin 171 swings inwardly into a cam slot with a quick motion, and swings the primary lever 165 in a counter-clockwise direction, which motion of the primary lever 165 results in the movement of the electrical switch 92 into its off position. The "Off" designation 66 comes into registration with the index marker 63 at this time. The cooking operation is now concluded and the range timer switch 92 is in its off or open position shown in FIG. 9. The front plate 80 has a relatively large opening 193 punched therethrough adjacent to the left hand arm 165a of primary lever 165 which carries the cam follower pin 171, and this arm of the lever is offset or bent forwardly so as to lie in the opening 193 and thus operate substantially in the plane of the front frame plate 80. The primary lever 165 also has an arm 165b extending toward the right and hooked to the underside of this arm is an upwardly extending tension spring 195 which normally biases the cam follower 171 in a downward direction so as to maintain it in engagement with the cam surfaces. A relatively large opening 196, punched out of the front frame plate 80, serves to accommodaate part of the diametrical thickness of the spring 195.

Referring now to the second lever 166, which is also pivoted on the pivot stud 71, this second lever has a lost motion connection with the primary lever 165, comprising an arcuate slot 197 in the lever 165 engaging over a limiting pin 198 carried by the second lever 166. Extending to the right from the upper portion of the second lever 166 is an arm 166a, to which the upper end of the tension spring 195 is hooked, whereby the tension of such spring normally holds the pin 198 up against the upper end of the lost motion slot 197.

Formed in the upper portion of the second lever 166 is a cam slot 201 of inverted V-shape. Responding to such cam slot 201 is a cam follower roller or pin 202 which projects forwardly from the lower arm 167a of the third lever 167. The cam follower roller 202 is mounted on a transverse pin 203 carried by the lower lever arm 167a. The lever 167 extends inwardly and has an apertured end 167b which has pivotal mounting over the arbor assembly 112–114. The lever 167 is also formed with an upper arm 167c, from the end of which a switch actuating lug 204 is bent in a rearward direction. This lug 204 is adapted to engage a switch actuating arm 205 projecting forwardly from the electric switch 92, as best shown in FIGS. 8 and 9. When the lever 167 swings downwardly the lug 204 is also moved downwardly, thereby swinging the switch actuating arm 205 into the switch closing position. Conversely, when the lever 167 swings upwardly the lug 204 is moved upwardly correspondingly so that the switch actuating arm 205 can swing upwardly to the switch opening position.

Referring now to the fourth lever 168 which responds to the lost motion pin 198 of second lever 166 for effecting the axial shifting movement of the slotted time driven gear wheel 125, this lever is of approximately bell-crank outline, comprising two arms 209–210, FIGS. 8 and 9, and substantially at the juncture of these two arms the lever is formed with a projecting pivot tab 211 which projects rearwardly through a pivot slot 212 formed in the back frame plate 81. The forwardly extending arm 209 has a laterally bent lug 214 which is apertured to engage over the projecting rear end of the pin 198 carried by the second lever 166. When this second lever 166 swings into the different positions, the bell-crank or fourth lever 168 is oscillated around its pivot tab 211. The downwardly extending arm 210 of this bell-crank lever has an inwardly projecting lug 216 at its lower end which extends into the grooved shift collar 127 provided on the back side of the slotted time driven gear 125. When the first and second levers 165 and 166 are shifted, the bell-crank lever 168 is rocked to cause its lower arm 210 to thrust forwardly on the slotted time driven gear 125, whereby the forward face of this slotted gear 125 is pressed forwardly against the ends of the tripping lugs 131 and 132 projecting from the planetary gear carrier 130. Accordingly, under this condition, when the slots 128–129 in the continuously rotating time driven wheel 125 come into registration with the tripping lugs 131 and 132 on the planetary gear carrier, the interlocking relation between the slots and lugs will occur. Conversely, when the first and second levers 165–166 are shifted in the opposite direction, the bell-crank lever 168 is swung in the reverse direction to move the slotted time driven gear 125 rearwardly out of the rotative path of the tripping lugs 131 and 132 on the planetary pinion carrier.

The electrical switch 192 can be of any desired or conventional construction. In the form illustrated, the switch actuating arm 205 is in the form of an insulating projection extending forwardly from the center of an insulating yoke 222 which, as shown in FIGS. 8 and 9, has rocker or tiltable mounting on a fulcrum wedge 223 projecting forwardly from the insulating base molding of the switch. The lower arm 222b of this yoke carries either one or a pair of horizontally spaced shiftable rods 224 passing therethrough at opposite ends of the yoke arm 222b, each of these rods having its opposite ends headed and provided with a compression spring 224a which normally holds a contact bridging bar 225 pressed rearwardly in a position to establish spanning contact across a pair of stationary electrical contacts 226 located on opposite sides of the lower yoke arm 222b. Outer connector terminals 227 connect with the stationary electrical contacts 226. When the yoke 222 is in the position shown in FIG. 8, the movable bridging contact 225 is closing the circuit through the stationary contacts 226, and when the yoke is in the position shown in FIG. 9, the contacts are separated. Passing through the upper arm 222c of the yoke is a double headed spring rod 228 which carries a compression spring 229 for normally biasing the rocker yoke 222 into the open circuit position shown in FIG. 1.

For setting the interval time dial 45 relative to its index marker 43, the outer knob 47 is rotated together with the hollow shaft 48 on which it is mounted. The hollow shaft 48 is held in its outer position, FIG. 5, by a coil compression spring 234 which reacts between the front plate 80 and a pinion 235 that is rotatable with the shaft 48. The pinion 235 in this position meshes with gear teeth 236 around the periphery of the interval timer dial 45 which is secured to a smaller diameter gear 238 and both gears are mounted on a bushing 239, FIG. 6, for conjoint rotation. An intermediate gear 240 is driven by gear 238 which is secured to and drives a shaft 245 that has secured thereto a gear 247 provided with a toothless gap 247a, FIG. 7. The teeth of gear 247 are engageable with a pinion 248 which forms a part of a slip clutch 249 that is driven by a pinion 250 which has driving connection through the gear train shown in FIG. 5 including a gear 251 which meshes with the motor driven pinion 98.

Formed integrally with the gear 247 is a cam 256, FIG. 7, provided on its periphery with two closely spaced humps 257 and 258, defining a notch 259 therebetween, the bottom of which notch has substantially the same radius as the main peripheral portion of the cam 256. Spaced beyond the notch 259 and trailing hump 258 is a relatively deep notch 261. Responding to these humps and notches is a narrow pointed finger 264 which projects inwardly from a vibratory reed 266 which has hinged mounting on a stud 265 extending forwardly from the rear frame plate 81 and is spring biased in an inward direction by spring 267 to hold the sensing finger 264 pressed resiliently against the surface of cam 256. Extending rearwardly from that portion which carries the sensing finger 264, the reed is formed with a right angle leg 269, FIG. 3, which is arranged to be attracted toward an extension 270 of the synchronous motor 91 so as to be responsive to the magnetic field in such motor.

When the interval time dial 45 is set by the outer knob 47, the gear 247 is rotated together with the cam 256 to the desired interval. The motor 91 drives the interval time dial 45 to the zero time position whereupon the finger 264 engages notch 261 in cam 256 to release the reed 266 to vibrate and generate an audible signal. When the toothless gap 247a registers with the pinion 248, there is no further driving action to the gear 247. The signal continues until the outer knob 47 rotates the interval time dial 45 to the "OFF" position in which the finger 264 engages the cam 256 between the humps 257 and 258 to hold the leg 269 out of action with respect to the extension 270 of the magnetic field structure of the motor 91.

The stop cooking time is set by moving the outer knob 47 inwardly against the action of the spring 234 to shift the pinion 235 out of engagement with the gear teeth 236 on the interval time dial 45 to the broken line position shown in FIG. 5 and into engagement with intermediate gear 146 which rotates the stop time gear 147 and the stop time hand 36 to the desired stop time relative to the hours scale 32. Also the intermediate gear 146 rotates the front pinion 138 to rotate the sun gear 140 of the planetary gear system PG. The cooking hours dial 54 is set by the knob 67 through pinion 69 which also meshes with spur teeth 157 of the planetary ring gear 150 to rotate it to the corresponding position for effecting a corresponding setting of the planetary gear system PG. At the beginning of the coking period, the switch 92 is closed to effect energization of the electrically or gas heated oven. At the end of the cooking period, the switch 92 is opened.

It has been possible to materially reduce the over-all dimensions of the timing mechanism to a length of about 3.25" and a width of about 2.625" by shifting the interval time dial 45 and its sight window 42 to the position underneath the hours scale 32 and mounting the stop time hand 36 to cooperate with the hours scale 32. Further the setting of the time interval and the setting of the stop cooking time are combined in the outer knob 47 that is rotatably and endwise slidably mounted on the time setting shaft 38.

Employing the construction disclosed herein, it will be noted that the axes of rotation of the hands 33–36, of the time set knob 37 and the associated outer knob 47 and of the cook hours set knob 67 are located at the respective apices of a triangle 271 indicated by broken lines in FIG. 1. The triangle 271 is a right triangle with the axis of rotation of the knobs 37 and 47 or of the time setting shaft 38 and of the hollow setting shaft 48 located at the apex of the right angle.

What is claimed as new is:

1. A timing mechanism for closing and opening a switch to energize and deenergize an oven at predetermined times by a synchronous electric motor arranged to drive time indicating hands relative to an hours scale including a planetary gear system controlled jointly in accordance with the number of cooking hours during which said switch is closed and the stop cooking time at which said switch is opened, and an interval timer adapted to be driven by said synchronous electric motor, said timing mechanism being characterized by a stop time hand rotatable coaxially of said time indicating hands relative to said hours scale, a time setting shaft for setting said time indicating hands, and setting means rotatably and slidably mounted on said time setting shaft and arranged in one position to set said interval timer and in another position to set said stop time hand and to adjust accordingly said planetary gear system.

2. The timing mechanism according to claim 1 wherein said setting means includes a knob on a sleeve having a pinion for driving an interval dial in one position and for driving said stop time hand in another position and, spring means bias said knob, sleeve and pinion to said one position.

3. The timing mechanism according to claim 2 wherein a rotatable cooking hours setting knob is arranged to adjust accordingly said planetary gear system, and the axes of rotation of said time indicating hands, of said time setting shaft and of said cooking hours setting knob are located at the respective apices of a triangle.

4. The timing mechanism according to claim 3 wherein said triangle is a right triangle and said axis of rotation of said time setting shaft is located at the apex of the right angle.

5. The timing mechanism according to claim 1 wherein a sight window is located in a dial plate above said time setting shaft, and an interval dial bearing time indicia registers with said sight window.

6. A timing mechanism for closing and opening a switch to energize and deenergize an oven at predetermined times by a synchronous electric motor arranged to drive time indicating hands relative to an hours scale including a planetary gear system controlled jointly in accordance with the number of cooking hours during which said switch is closed and the stop cooking time at which said switch is opened, and an interval timer adapted to be driven by said synchronous electric motor, said timing mechanism being characterized by a stop time hand rotatable coaxially of said time indicating hands relative to said hours scale, cook hours setting shaft means connected to said planetary gear system to set the number of cooking hours, stop time setting shaft means connected to said planetary gear system and to said stop time hand to set the stop time, and interval setting shaft means connected to said interval timer for setting said time interval, said stop time setting shaft means and said interval setting shaft means being coaxial and in parallel spaced relation to said cook hours setting shaft means.

7. The timing mechanism according to claim 6 wherein the axes of rotation of said stop time hand, of said cook hours setting shaft means and of said stop time and interval setting shaft means are located at the respective apices of a triangle.

References Cited

UNITED STATES PATENTS

| | | |
|---|---|---|
| 3,065,314 | 11/1962 | Barton et al. |
| 3,098,131 | 7/1963 | Gallagher et al. |
| 3,124,668 | 3/1964 | Zagorsky et al. |
| 3,244,841 | 4/1966 | Gardes et al. |
| 3,262,110 | 7/1966 | Gardes. |

ROBERT K. SCHAEFER, Primary Examiner

J. R. SCOTT, Assistant Examiner

U.S. Cl. X.R.

74—3.54